US008568007B2

(12) United States Patent
Myojin et al.

(10) Patent No.: US 8,568,007 B2
(45) Date of Patent: Oct. 29, 2013

(54) VEHICLE HEADLIGHT

(75) Inventors: Norikatsu Myojin, Tokyo (JP); Masafumi Ohno, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 275 days.

(21) Appl. No.: 13/070,137

(22) Filed: Mar. 23, 2011

(65) Prior Publication Data

US 2011/0235357 A1 Sep. 29, 2011

(30) Foreign Application Priority Data

Mar. 23, 2010 (JP) ................................. 2010-066338

(51) Int. Cl.
*F21V 29/00* (2006.01)
*B60Q 1/04* (2006.01)

(52) U.S. Cl.
USPC ............................ 362/547; 362/294; 362/373

(58) Field of Classification Search
USPC ..................... 362/545, 547, 249.02, 294, 538
See application file for complete search history.

(56) References Cited

U.S. PATENT DOCUMENTS

| | | | | |
|---|---|---|---|---|
| 6,372,337 | B2 * | 4/2002 | Takahashi et al. | 428/328 |
| 7,510,400 | B2 * | 3/2009 | Glovatsky et al. | 439/56 |
| 7,520,647 | B2 | 4/2009 | Tachibana | |
| 7,651,245 | B2 * | 1/2010 | Thomas et al. | 362/294 |
| 7,905,639 | B2 * | 3/2011 | Luo et al. | 362/487 |
| 8,201,976 | B2 * | 6/2012 | Cho et al. | 362/294 |
| 8,376,598 | B2 * | 2/2013 | Kondo et al. | 362/516 |
| 2002/0018885 | A1 | 2/2002 | Takahashi et al. | |

FOREIGN PATENT DOCUMENTS

| | | | |
|---|---|---|---|
| JP | 2000-63873 | A | 2/2000 |
| JP | 2009-218274 | A | 9/2009 |

* cited by examiner

*Primary Examiner* — Peggy A. Neils
(74) *Attorney, Agent, or Firm* — Kenealy Vaidya LLP

(57) ABSTRACT

A vehicle headlight can include a semiconductor light source and a heat sink to radiate heat developed from the light source. The headlight can include a mounting base board mounting the light source and attached on a radiating base plate of the heat sink. At least one of a bottom surface of the mounting base board and the radiating base plate can include a concave portion in which a depth thereof is deeper than a maximum particle size of an inclusion of a thermal conductive viscous material that spreads in the concave portion. The light source can be located at a prescribed position in an accurate fashion without a positional misalignment while the heat developed from the light source can efficiently radiate via the heat sink. Thus, the disclosed subject matter can provide headlights including a radiation structure having a high radiating performance and positional accuracy for the light source.

18 Claims, 11 Drawing Sheets

VEHICLE HEADLIGHT

This application claims the priority benefit under 35 U.S.C. §119 of Japanese Patent Application No. 2010-066338 filed on Mar. 23, 2010, which is hereby incorporated in its entirety by reference.

BACKGROUND

1. Field

The presently disclosed subject matter relates to vehicle headlights using a semiconductor light source, and more particularly to vehicle headlights including a radiation structure having a high radiation performance and positional accuracy for the semiconductor light source, which can prevent a positional misalignment of the semiconductor light source caused by variability due to an inclusion disposed in a thermal conductive viscous material.

2. Description of the Related Art

Various vehicle headlights incorporating a semiconductor light source have been developed in recent years because semiconductor light sources are battery friendly (lower power requirements), have long life, and are generally more eco-friendly, etc. For example, a conventional LED light source and a vehicle lamp using the LED light source are disclosed in Patent Document No. 1 (U.S. Pat. No. 7,520,647). The conventional LED light source disclosed in Patent Document No. 1 can be used as a light source for a reflector type vehicle headlight.

When the conventional LED light source described above is used for a vehicle headlight, the headlight may form a light distribution pattern by reflecting light emitted from the LED light source of the reflector. When a light distribution pattern for a low beam is formed by the LED light source and the reflector, the vehicle headlight may form a light distribution pattern for a low beam including a horizontal cut-off line by shielding an upward light by using a shade besides the reflector.

A light source for a vehicle headlight of a projector type that does not include a reflector and the shade is disclosed in co-pending commonly assigned Patent Document No. 2 Ser. No. 13/070,707. This conventional semiconductor light-emitting device may form a light distribution pattern for a low beam including a horizontal cut-off line via a projector lens without a reflector and a shade.

High power semiconductor light-emitting devices have recently been utilized as the light source for vehicle headlights in accordance with a trend toward miniaturization of the vehicle headlight, creating an appearance of a semiconductor device having a high brightness, the need for an eco-friendly vehicle and improved driving safely, etc. However, because high power semiconductor devices may generate a large amount of heat, various radiating/heat dissipation methods for high power semiconductor devices have been devised.

For example, a thermal conductive grease and a semiconductor device using the thermal conductive grease are disclosed in Patent Document No. 3 (Japanese Patent Application Laid Open No. 2000-63873). FIG. 11 is a cross-section view depicting the conventional semiconductor device including a radiation structure disclosed in Patent Document No. 3. The semiconductor device includes: a printed circuit board 203; a semiconductor chip 202 generating a large amount of heat that is mounted on the printed circuit board 203; a heat sink 204 located on the semiconductor chip 202; a thermal conductive grease 201 disposed between the semiconductor chip 202 and the heat sink 204; and cramping plates 205 attaching the heat sink 204 to the printed circuit board 203.

Therefore, because a large amount of heat generated from the semiconductor chip 202 may radiate from the heat sink 204 via the thermal conductive grease 201, the semiconductor device may operate normally even under high temperatures. In this case, the thermal conductive grease 201 includes a powder of aluminum to enhance the thermal conductivity thereof, and a mean particle size of the aluminum powder may be between 0.5 micrometers and 50 micrometers.

FIG. 10*a* is a cross-section view depicting a conventional vehicle headlight including a radiation structure. The conventional headlight 200 of FIG. 10*a* includes: a semiconductor light source 210; a thermal conductive grease 240 disposed underneath the semiconductor light source 210; a heat sink 230 located underneath the semiconductor light source 210 via the thermal conductive grease 240; and a reflector 220 located on the heat sink 230 so that light rays emitted from the semiconductor light source 210 are reflected in a light-emitting direction of the headlight 200.

The conventional headlight 200 can form a prescribed light distribution pattern with the light rays emitted from the semiconductor light source 210, which can conform to a light distribution standard for a headlight. Additionally, the headlight 200 can efficiently radiate heat developed from the semiconductor light source 210 from the heat sink 230 via the thermal conductive grease 240. However, when mass-producing the vehicle headlight 200, some products that form light distribution patterns that may not conform to the light distribution standards for a headlights are produced.

FIGS. 10*b* and 10*c* are explanatory cross-section views depicting conventional headlights when causing an upward light distribution and when causing a downward light distribution, respectively. Light Ray1 shown in FIG. 10*a* can fundamentally be emitted in a horizontal direction with respect to a road. However, the light Ray1 of FIG. 10*a* may change to an upward light Ray1-U in FIG. 10*b*. Accordingly, because the upward light Ray1-U may give a glaring type light to an oncoming vehicle, a light distribution pattern formed by a headlight shown in FIG. 10*b* may not conform to the light distribution pattern for a headlight.

In contrast, the light ray1 shown in FIG. 10*a* changes to a downward light Ray1-D in FIG. 10*c*. Therefore, because the downward light Ray1-D forms a downward light distribution, forward visibility may be reduced in comparison with the normal headlight 200 shown in FIG. 10*a*. In addition to the above-described cases, light distribution patterns that slant rightward or leftward may also be formed. When a reflective surface of the reflector 220 is configured with a plurality of free surfaces that need a high positional accuracy, the vehicle headlight 200 is subject to emission of the abnormal lights.

This is due to a variability in the particle size of an inclusion in the thermal conductive grease 240, and thereby the semiconductor light source 210 is likely to slant. Additionally, it is difficult to confirm whether the thermal conductive grease 240 spreads wholly between the heat sink 230 and the semiconductor light source 210 or not. If products having a thermal conductive grease 240 that does not spread between the heat sink 230 and the semiconductor light source 210 are used for a long time under a severe environment of a high temperature, some of the products may break down.

The above-referenced Patent Documents are listed below, and are hereby incorporated with their English abstracts in their entireties.

1. Patent Document No. 1: U.S. Pat. No. 7,520,647
2. Patent Document No. 2: Commonly owned patent application Ser. No. 13/070,707.
3. Patent Document No. 2: Japanese Patent Application Laid Open No. JP2000-63873

The disclosed subject matter has been devised to consider the above and other problems, features, and characteristics. Thus, embodiments of the disclosed subject matter can include vehicle headlights using a semiconductor light source that include a radiation structure having high radiation performance and positional accuracy for the semiconductor light source. The disclosed subject matter can also include a vehicle headlight that is configured such that it is relatively easy to confirm an applying state of a thermal conductive material through visual examination, especially whether the thermal conductive material is normally disposed between the heat sink and the semiconductor light source, and thus the amount of defective products such as described above can be reduced.

SUMMARY

The presently disclosed subject matter has been devised in view of the above and other problems, features, and characteristics. An aspect of the disclosed subject matter includes providing vehicle headlights of a projector type with a radiation structure having high radiation performance and positional accuracy for a semiconductor light source used as a light source, which can form a favorable light distribution pattern with a simple structure in a small size without a reflector and a shade. The vehicle headlights can also be configured such that it is relatively easy to confirm that a thermal conductive material has been correctly disposed between the semiconductor light source and a heat sink through visual examination.

According to an aspect of the disclosed subject matter, a vehicle headlight can include: a mounting base board having a top surface and a bottom surface that are opposite with respect to each other and are formed on substantially respective flat surfaces, and the top surface including a mounting region; a semiconductor light source mounted on the mounting region of the mounting base board; a heat sink including a radiating base plate that attaches to the mounting base board on a substantially flat top surface of the radiating base plate so that the bottom surface of the mounting base board is in contact with the top surface of the radiating base plate, wherein at least one of the bottom surface of the mounting base board and the top surface of the radiating base plate includes a concave portion so that the concave portion is larger than the mounting region of the mounting base board; and a thermal conductive viscous material including an inclusion that is spread or disposed in the concave portion, wherein a depth of the concave portion is deeper than a maximum particle size of the inclusion of the thermal conductive viscous material.

Furthermore, the vehicle headlight can include a reflector having a opening portion located adjacent the radiating base board of the heat sink so that light emitted from the semiconductor light source is emitted in a light-emitting direction of the vehicle headlight from the opening portion of the reflector. In this case, the reflector can be configured with a plurality of free surfaces. The vehicle headlight can further include a casing located adjacent the heat sink, and an outer lens located in front of the opening portion of the reflector so as to surround the vehicle headlight along with the casing.

In the above-described exemplary vehicle headlight, the vehicle headlight can further include at least one hole passing through the mounting base board except for the mounting region so that the hole is located toward the concave portion. The concave portion can be formed in a substantially rectangular shape and the holes can be located at four corners of the concave portion so as to be able to see each of the four corners of the concave portion via respective holes. The holes can also be located in a symmetric fashion with respect to a center of the semiconductor light source. The thermal conductive viscous material can be a silicone grease, and also can includes at least one inclusion of aluminum, alumina, copper oxide, zinc oxide and a ceramic. The semiconductor light source can include at least one blue light-emitting chip and a wavelength converting material that is selected from the group consisting of a yellow phosphor, and two phosphors of a red phosphor layer and a green phosphor layer, and also can include an ultraviolet light-emitting chip and a wavelength converting material including at least one of a red phosphor, a green phosphor and a blue phosphor.

According to the above-described exemplary vehicle headlight, because the thermal conductive viscous material including the inclusion having a high thermal conductivity can be wholly or completely spread into the concave portion, heat generated from the semiconductor light source can efficiently radiate to the heat sink via the thermal conductive viscous material. Moreover, because the depth of the concave portion can be deeper than the maximum particle size of the inclusion in the thermal conductive viscous material, the semiconductor light source can be located at a prescribed position without a positional misalignment with respect to the reflector. Furthermore, it is easy to confirm whether or not the thermal conductive viscous material is spread (is distributed) in the concave portion from the holes.

Another aspect of the disclosed subject matter includes a vehicle headlight of a projector type having a small size. The vehicle headlight can include a structure set forth in paragraph [0017], and can further include a projector lens having a light outgoing surface and a rear surface located in front of the semiconductor light source so that light emitted from the semiconductor light source is emitted in a light-emitting direction of the vehicle headlight from the light outgoing surface of the projector lens. In this case, at least one of the light outgoing surface and the rear surface of the projector lens can be configured with a plurality of free surfaces. The vehicle headlight can further include a casing located adjacent the projector lens and the heat sink so as to cover the vehicle headlight. In addition, the same or similar variations of the vehicle headlight of the reflector type can also be employed as set forth in paragraph [0019].

According to the exemplary projector type headlight, because the depth of the concave portion can be deeper than the maximum particle size of the inclusion in the thermal conductive viscous material, the semiconductor light source can be located at a prescribed position without a positional misalignment with respect to the projector lens and the radiating base plate. Thus, the vehicle headlight can be mass-produced so that a light distribution pattern thereof can conform to a light distribution standard for a headlight even when the light outgoing surface of the projector lens is configured with a plurality of free surfaces that need a high accuracy with respect to its positional relation. Furthermore, the projector type headlight does not need a reflector and a shade, and also can efficiently radiate the heat generated from the semiconductor light source from the heat sink even when the semiconductor light source is sealed with the casing and the like. Thus, a projector headlight having a small size such that it can be employed for a small size car, such as an electric car and the like, can be accomplished.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
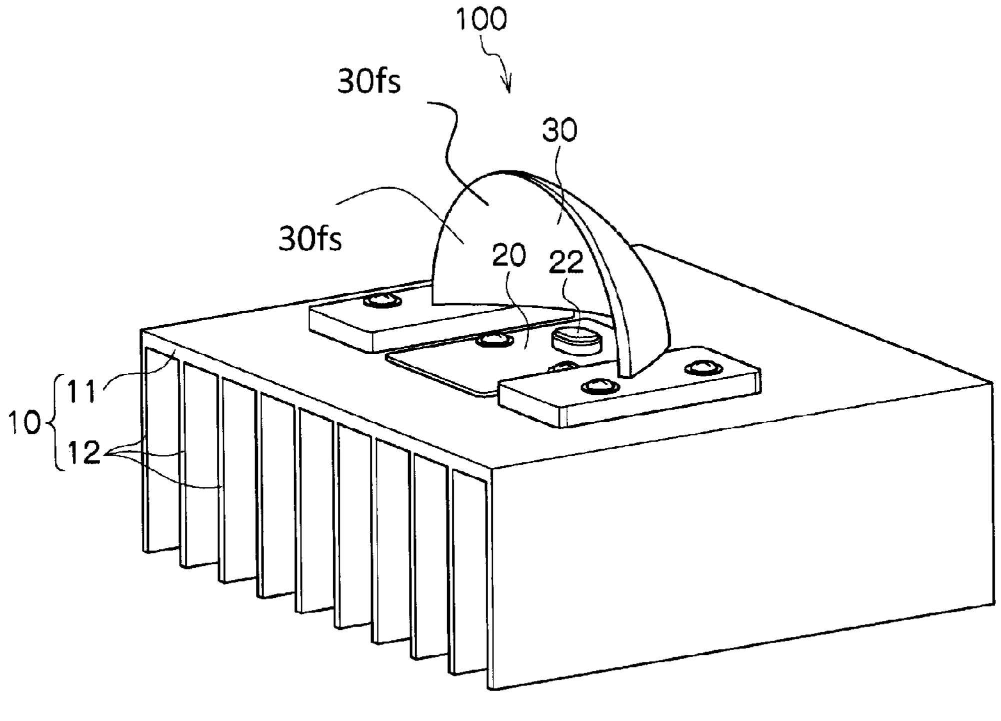
FIG. 1 is a perspective view showing a first exemplary embodiment of a vehicle headlight made in accordance with principles of the disclosed subject matter.

Exemplary embodiments of the disclosed subject matter will now be described in detail with reference to FIGS. 1 to 9. FIG. 1 is a perspective view showing a first exemplary embodiment of a vehicle headlight made in accordance with principles of the disclosed subject matter, wherein a casing and an outer lens are not shown in FIG. 1 in order to facilitate a clear understanding of the disclosed subject matter.

A vehicle headlight 100 can include: a semiconductor light source 22; a mounting base board 20 for mounting the semiconductor light source 22 thereon; a heat sink 10 composed of a radiating base plate 11 and a radiating fin 12 and located adjacent a vehicle headlight casing, the mounting base board 20 formed on the radiating base plate 11; a reflector 30 having an opening located on the radiating base plate 11 of the heat sink 10, and the reflector 30 covering the semiconductor light source 22 so that light emitted from the semiconductor light source 22 can be emitted in a light-emitting direction of the vehicle headlight 100 from the opening thereof; whereby an outer lens can be located in front of the opening of the reflector 30 so as to surround the vehicle headlight 100 along with the casing.

The reflector 30 can be configured with a parabolic surface having a focus, in which the focus is located substantially at the semiconductor light source 22. Thereby, the light emitted from the semiconductor light source 22 can be reflected onto the reflector and toward the opening, and can be emitted in the light-emitting direction of the vehicle headlight 100 via the outer lens. The reflector 30 can also be configured with a plurality of free surfaces 30*fs* based upon a spline curve, Bezier surface, etc. In addition, the reflector 30 can also be configured with a plurality of ellipsoidal reflectors as disclosed in Patent Document No. 1.

Figure 2:
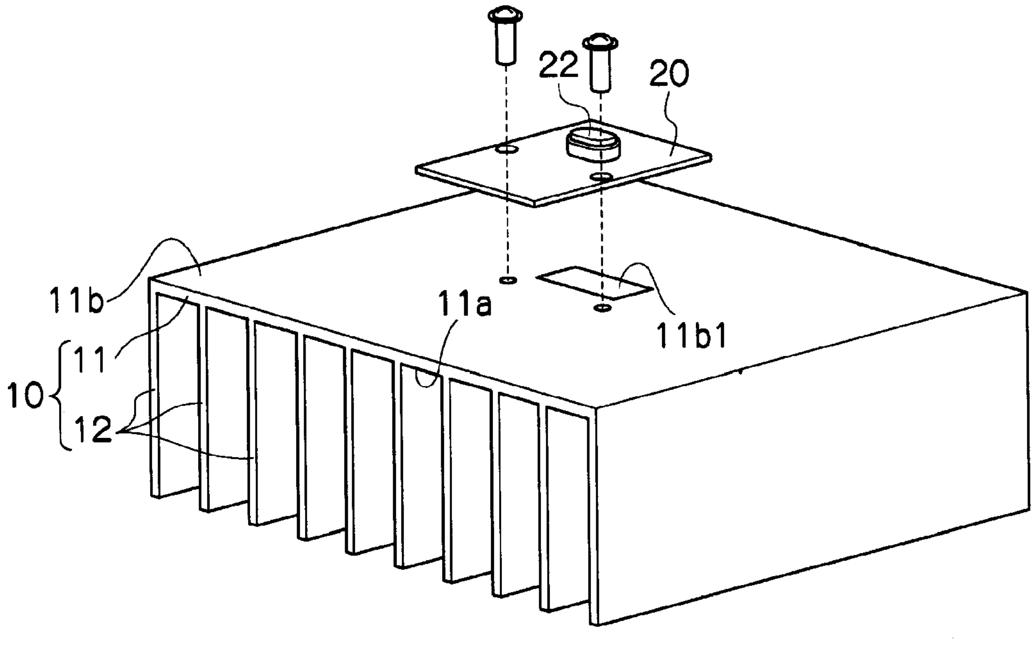
FIG. 2 is an exploded perspective view depicting the vehicle headlight of FIG. 1, wherein a reflector is not shown.

FIG. 2 is an exploded perspective view depicting the vehicle headlight 100 of FIG. 1, wherein the reflector 30 is not shown. The mounting base board 20 can include a top surface and a bottom surface that are opposite with respect to each other and are formed as substantially respective flat surfaces. The top surface of the mounting base board 20 can include a mounting region to mount the semiconductor light source 22. The mounting base board 20 can be attached on a top surface 11*b* of the radiating base plate 11 via screws so that the bottom surface of the mounting base board 20 can be in tight contact with the top surface 11*b* of the radiating base plate 11.

The radiating base board 11 of the heat sink 10 can include a bottom surface 11*a* located opposite the top surface 11*b* and a concave portion 11*b*1 that is located underneath the bottom surface of the mounting base board 20. An opening of the concave portion 11*b*1 can include and/or be disposed adjacent to an opposite surface of the mounting region of the mounting base board 20, which is located on the bottom surface of the mounting base board 20. Therefore, the concave portion 11*b*1 can be larger than the mounting region for mounting the semiconductor light source 20 and can be smaller than the bottom surface of the mounting base board 20.

Figure 3:
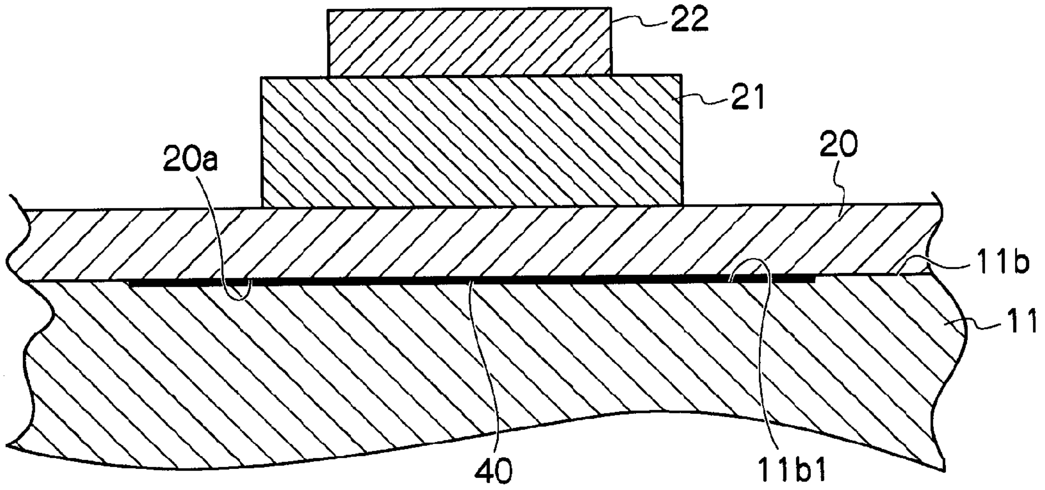
FIG. 3 is a partial close-up cross-section view depicting a concave portion in the vehicle headlight of FIG. 2.

FIG. 3 is a partial close-up cross-section view depicting the concave portion 11*b*1 in the vehicle headlight 100. The heat sink 10 can be composed of aluminum having a high thermal conductivity and the like, and also the mounting base board 20 can be composed of an aluminum plate, a copper plate having a high thermal conductivity, etc. The semiconductor light source 22 can be mounted on the mounting region of the top surface of the mounting base board 20 via a sub mount substrate 21, which is composed of a ceramic having a high thermal conductivity and a high heat resistance.

The mounting base board 20 can include an opposite portion 20*a* located on the bottom surface thereof, and the opposite portion 20*a* can correspond to and/or be located adjacent to the opening of the concave portion 11*b*1 of the radiating base plate 11 of the heat sink 10. Accordingly, the opposite portion 20*a* can be larger than the mounting region where the sub mount substrate 21 is mounted on the top surface of the mounting base board 20, and also can include the opposite surface of the mounting region, which is located on the bottom surface of the mounting base board 20.

In a space or opening formed between the concave portion 11*b*1 of the radiating base plate 11 and the opposite portion 20*a* of the mounting base board 20, a thermal conductive viscous material such as a thermal conductive grease, a thermal conductive adhesive material and the like can spread. A silicone grease and the like can be used as the thermal conductive grease, and a silicone adhesive material and the like can be used as the thermal conductive adhesive material. Additionally, the thermal conductive viscous material can include an inclusion such as aluminum, alumina, copper oxide, zinc oxide, a ceramic and the like to enhance a thermal conductivity thereof.

Figure 4:
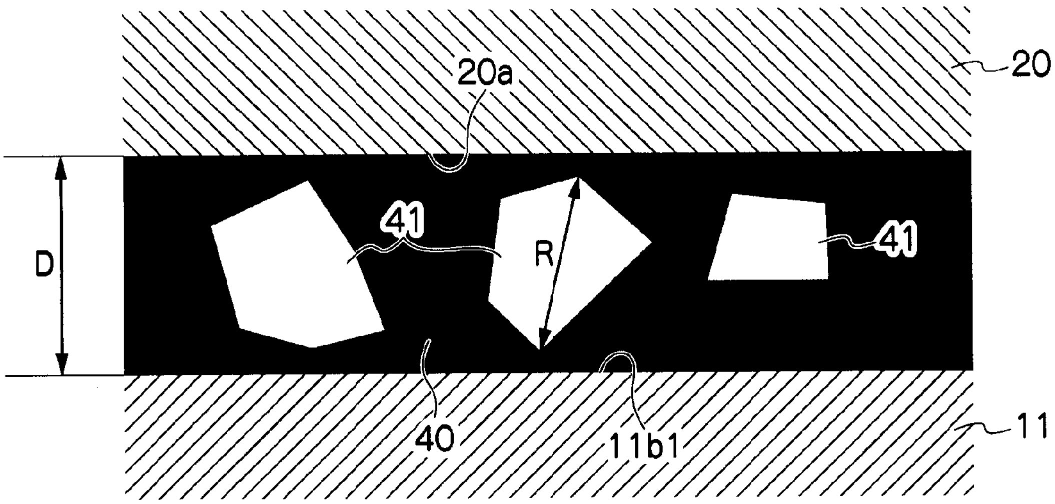
FIG. 4 is a partial enlarged cross-section view showing the concave portion of FIG. 2.

FIG. 4 is a partial enlarged cross-section view showing the concave portion 11*b*1 of the radiating base plate 11. Marks 40 and 41 denote the thermal conductive viscous material (40) and the inclusion (41) disposed in the thermal conductive viscous material, respectively. A thickness D of the space between the concave portion **11*b*1 and the opposite portion 20*a* can be thicker than a maximum particle size R of the inclusion 41**. For example, the thickness D of the space can be 100 micrometers when the maximum particle size R is 50 micrometers.

When the thermal conductive viscous material 40 is disposed in the space between the concave portion **11*b*1 and the opposite portion 20*a*, an amount of the thermal conductive viscous material 40 corresponding to the space can be applied near a central part of the concave portion 11*b*1. Then, the mounting base board 20 can be attached on the radiating base plate 11 of the heat sink 10 via the screws so that the opposite portion 20*a* thereof faces the opening of the concave portion 11*b*1 of the radiating base plate 11**.

Thereby, the thermal conductive viscous material 40 can wholly spread in the space between the concave portion **11*b*1 and the opposite portion 20*a*. In the vehicle headlight 100, heat generated from the semiconductor light source 22 can efficiently radiate from the radiating fin 12 via the sub mount substrate 21, the mounting base board 20, the thermal conductive viscous material 40 and the radiating base plate 11. Thus, the vehicle headlight 100** can operate normally even when being used for a long time under the severe environment caused by high temperatures.

In addition, because the thickness of the space between the concave portion **11*b*1 and the opposite portion 20*a* is thicker than the maximum particle size R of the inclusion 41 disposed in the thermal conductive viscous material 40, the semiconductor light source 22 can be located at a prescribed position with respect to the reflector 30 and the radiating base plate 11 in an accurate fashion. Thus, the vehicle headlight 100 can be mass-produced so that a light distribution pattern thereof can conform to the light distribution standards for a headlight. In this case, a shade can be located in front of the opening of the reflector 30** to form a horizontal cut-off line for a low beam.

Figure 5:
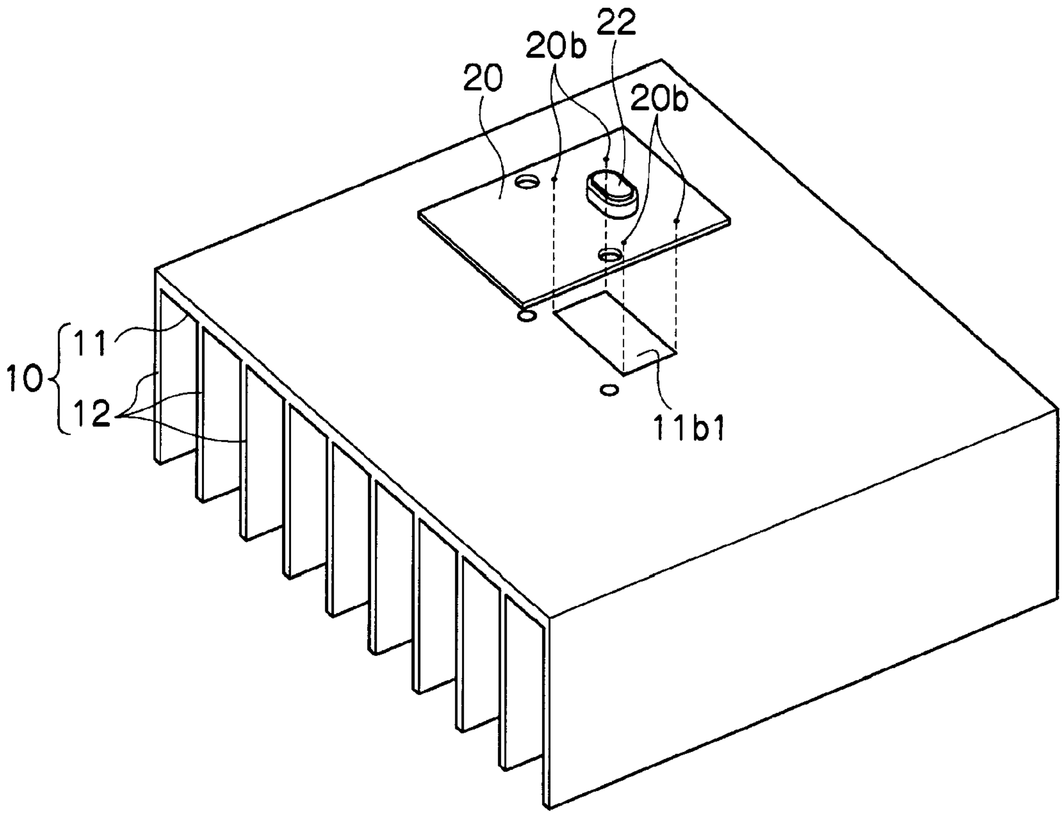
FIG. 5 is a perspective view showing a first variation of the vehicle headlight of FIG. 1, wherein the reflector is not shown.

Exemplary variations of the first embodiment will now be described. FIG. 5 is a perspective view showing a first variation of the vehicle headlight 100, wherein the reflector 30 is not shown. In the first variation, the opposite portion **20*a* and the concave portion 11*b*1 can be formed in a substantially rectangular shape. Four holes 20*b* (e.g. 0.5 millimeters in diameter) that pass through the opposite portion 20*a* of the mounting base board 20, except for the mounting region, can be provided at four corners of the opposite portion 20*a*. Accordingly, the degree to which the thermal conductive viscous material 40 is applied in the space between the concave portion 11*b*1 and the opposite portion 20*a* can be confirmed from the holes 20*b***.

When the thermal conductive viscous material 40 can be seen from the four holes **20*b*, it may normally spread in the space between the concave portion 11*b*1 of the radiating base plate 11 and the opposite portion 20*a* of the mounting base board 20. However, when the thermal conductive viscous material 40 cannot be seen from at least one of the holes 20*b***, it may not normally spread throughout the space. In this case, when the vehicle headlight is used for a long time under a severe environment of a high temperature, the vehicle headlight may break down. Therefore, this first variation can prevent defective products, such as those described above, from entering the market.

Figure 6:
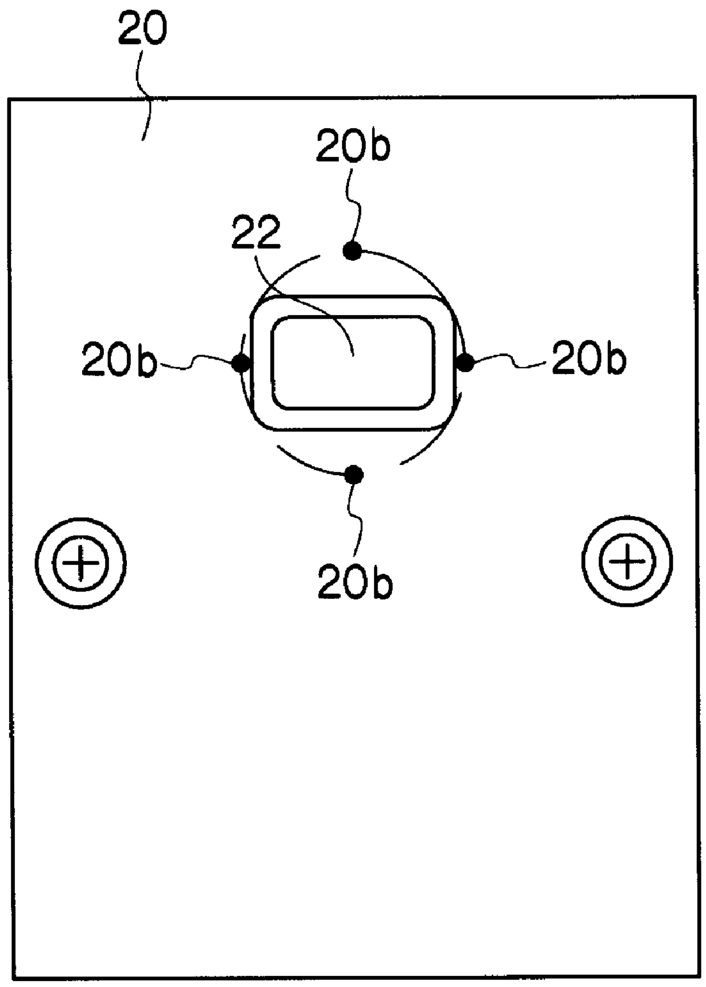
FIG. 6 is a top view showing a second variation of the vehicle headlight of FIG. 1, wherein the reflector is not shown.
Figure 7:
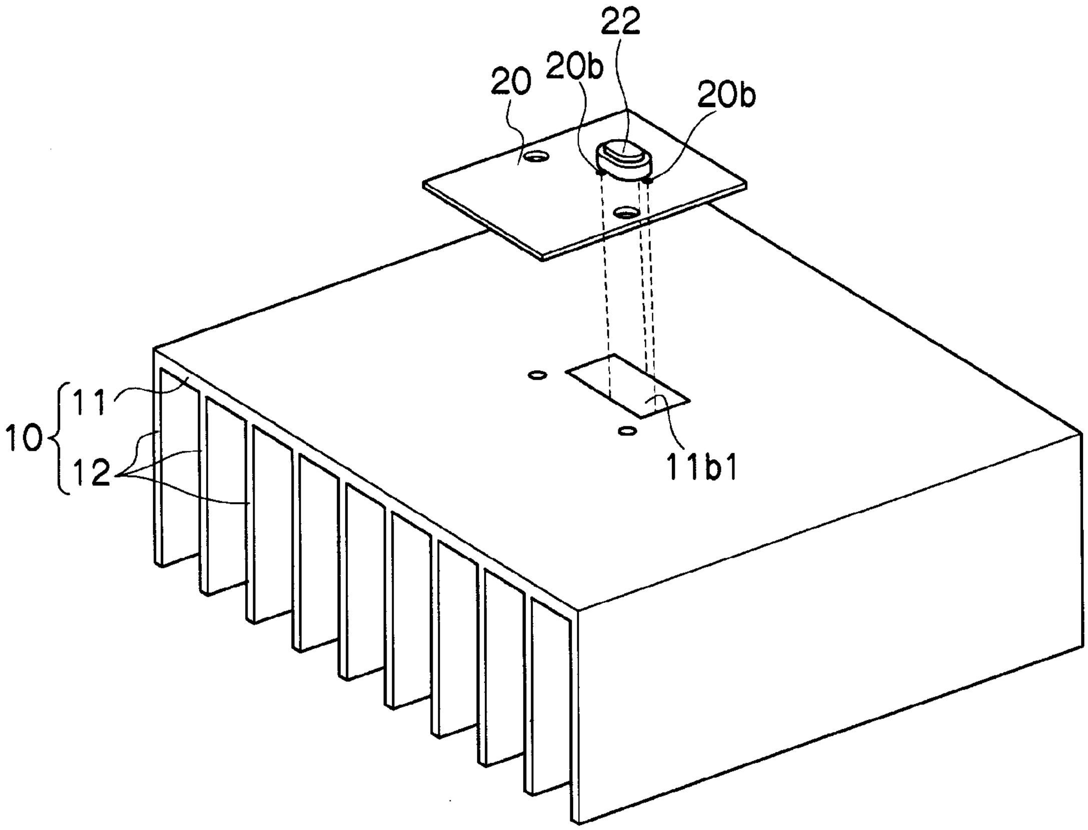
FIG. 7 is a perspective view showing a second variation of FIG. 6.

FIG. 6 is a top view showing a second variation of the vehicle headlight 100, and FIG. 7 is a perspective view showing the second variation. In the second variation, the holes **20*b* can be provided around semiconductor light source 22 so as to be located in a symmetric fashion with respect to a center of the semiconductor light source 22 and therefore, whether the thermal conductive viscous material 40 spreads underneath the semiconductor light source 22 or not can be confirmed from the four holes 20*b***.

Figure 8:
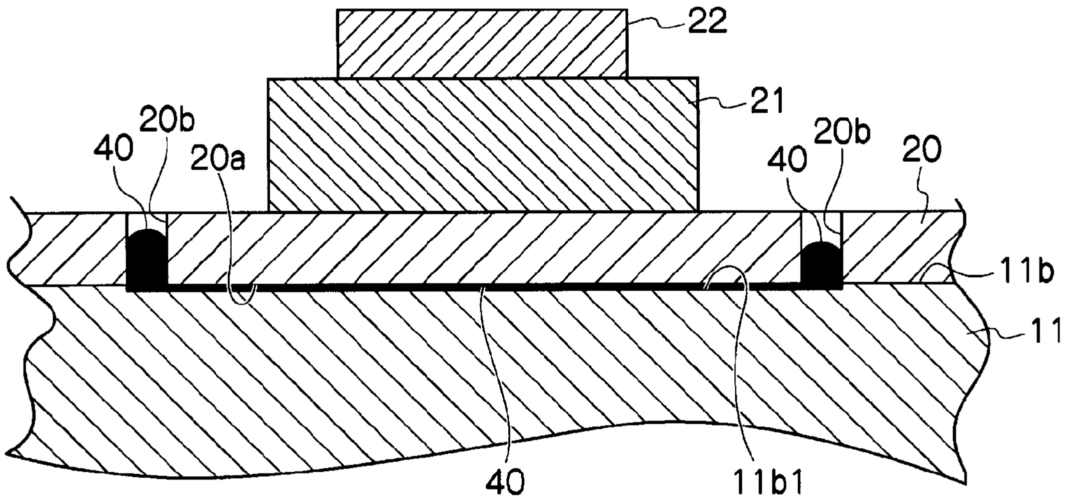
FIG. 8 is a partial close-up cross-section view showing a concave portion in the first and second variations of FIGS. 5 to 7.

FIG. 8 is a partial close-up cross-section view showing the concave portion **11*b*1 in the first and second variation. As shown in FIG. 8, when the amount (volume) of the thermal conductive viscous material 40 is greater than the volume of space between the concave portion 11*b*1 and the opposite portion 20*a*, an excess amount of the thermal conductive viscous material 40 can enter into the holes 20*b*. Accordingly, the mounting base board 20 is not separated from the radiating base plate 11 of the heat sink 10 due to an excess amount of the thermal conductive viscous material 40. Additionally, because the holes 20*b* can prevent including bubbles in the thermal conductive material 40, thermal conductivity from the semiconductor light source 22 to the heat sink 10** can improve.

Figure 9A:
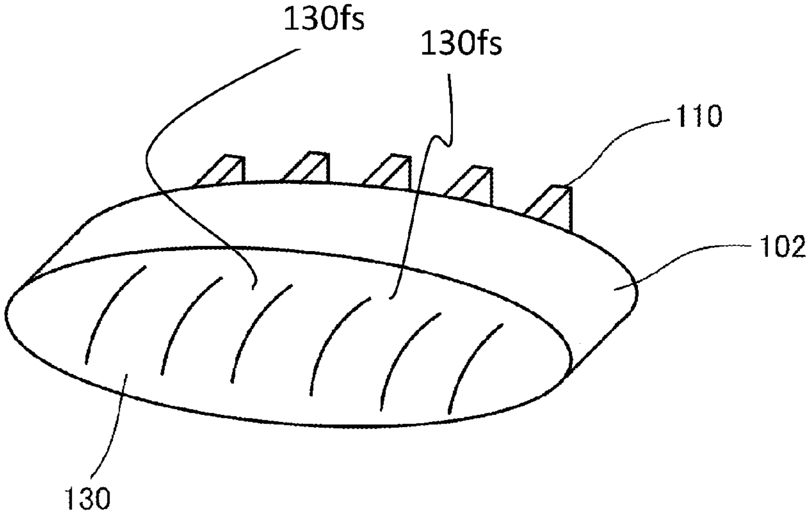
FIG. 9*a* is a perspective view showing a second exemplary embodiment of the vehicle headlight made in accordance with principles of the disclosed subject matter.
Figure 9B:
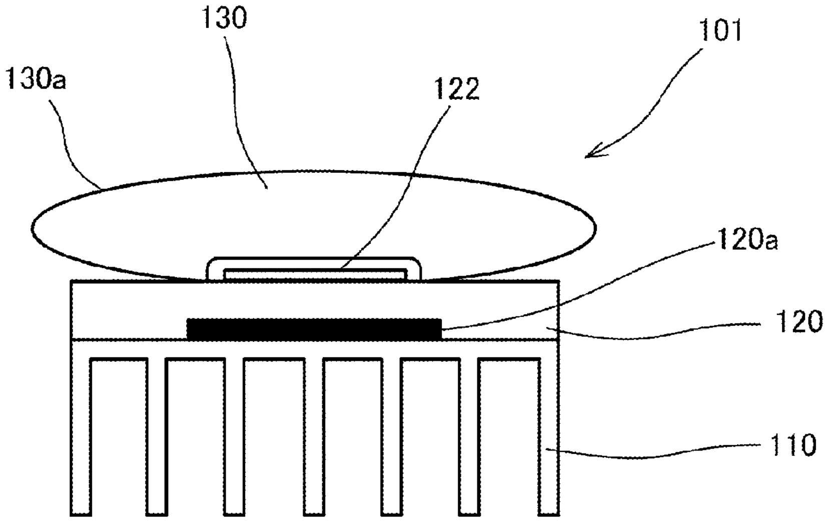
FIG. 9*b* is a cross-section view showing the vehicle headlight of FIG. 9*a;*
Figure 10A:
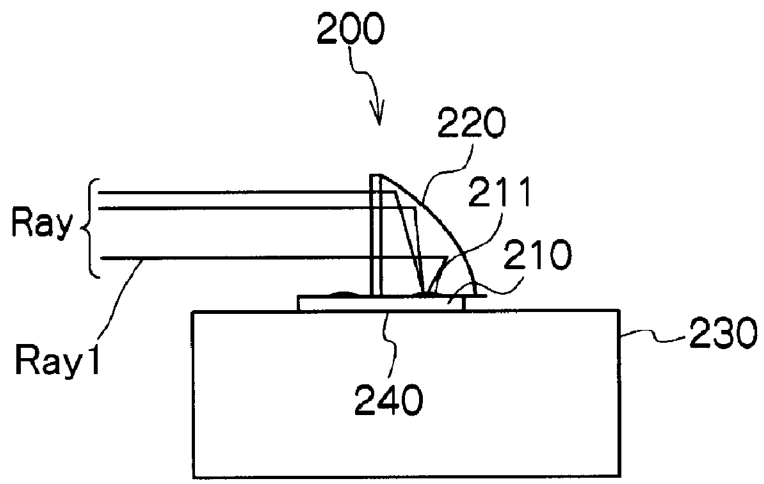
FIG. 10a Conventional Art
FIG. 10*a* is a cross-section view depicting a conventional headlight including a radiation structure.
Figure 10B:
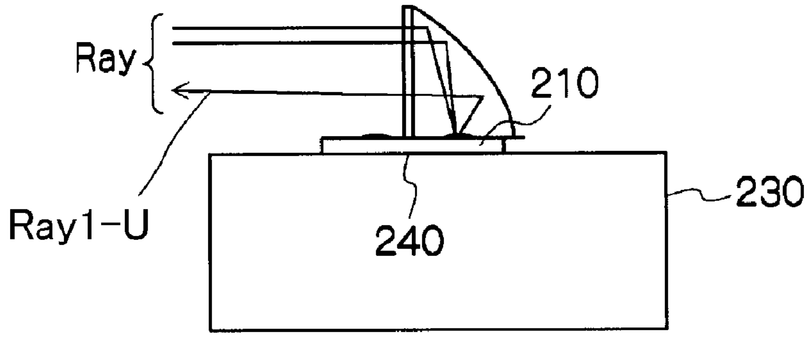
FIG. 10b Conventional Art
FIGS. 10*b* and 10*c* are explanatory cross-section views depicting the conventional headlights when causing an upward light distribution and when causing a downward light distribution, respectively.
Figure 10C:
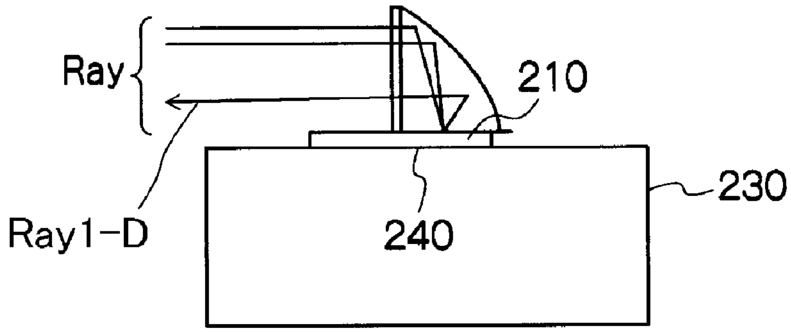
FIG. 10c Conventional Art
Figure 11:
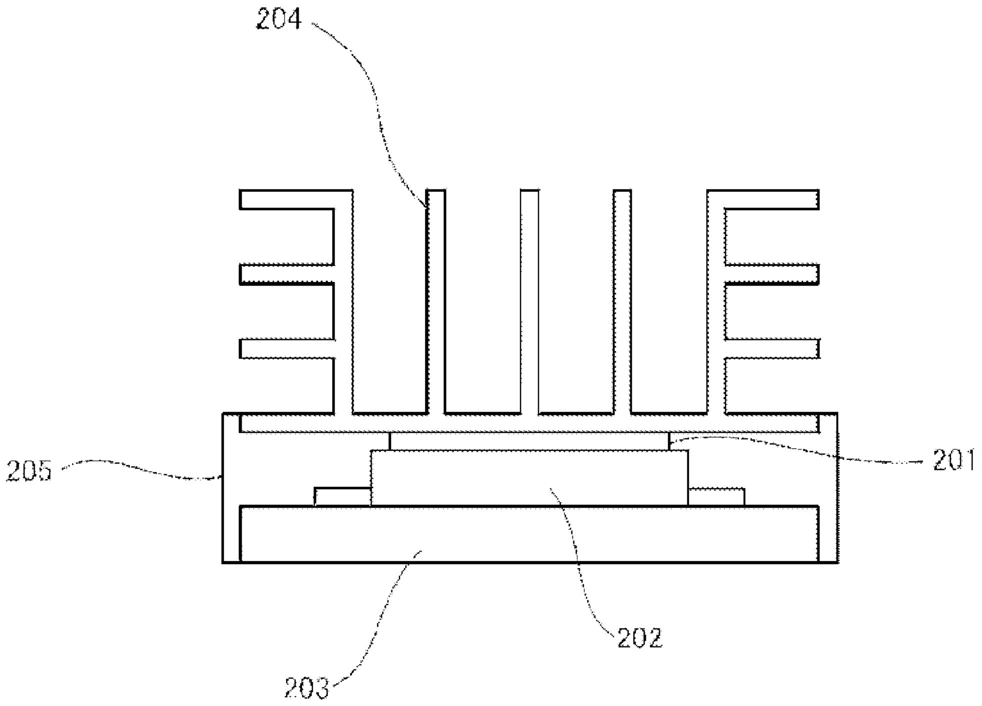
FIG. 11 Conventional Art
FIG. 11 is a cross-section view depicting a conventional semiconductor device including a radiation structure.

Next, a second exemplary embodiment of the disclosed subject matter will now be described. FIG. **9*a* is a perspective view showing the second exemplary embodiment of the vehicle headlight made in accordance with principles of the disclosed subject matter, and FIG. 9*b* is a cross-section view showing the vehicle headlight in which a casing 102 is not shown. The second embodiment relates to a vehicle headlight of a projector type without the reflector 30**.

The vehicle headlight 101 can include: a semiconductor light source 122; a mounting base board 120 mounting the semiconductor light source 122 thereon; a heat sink 110 composed of a radiating base plate and a radiating fin and located adjacent the casing 102, the semiconductor light source 122 being mounted onto the radiating base plate via the mounting base board 120; and a projector lens 130 located in front of the semiconductor light source 122 so that light emitted from the semiconductor light source 122 can be emitted in a light-emitting direction of the vehicle headlight 101 via the projector lens 130.

The projector lens 130 can be composed of a transparent thermoplastic, which includes various materials such as a polycarbonate resin, a metacrylate resin, a cycloolefin resin, and other similar materials that can be used to form the projector lens 130. The projector lens 130 can include a light outgoing surface **130*a* configured with a plurality of free surfaces 130*fs* based upon a spline curve, Bezier surface and the like so that the light emitted from the semiconductor light source 122** can form a light distribution pattern which can conform to light distribution standards for a headlight.

The projector lens 130 can include the light outgoing surface **130*a* and a rear surface, which are opposite with respect to each other and can be curved outward in a convex shape. In this case, the projector lens 130 may include light that is reflected from the outgoing surface 130*a* toward the rear surface. Accordingly, in order to return the reflected light toward the light outgoing surface 130*a***, the rear surface can be configured with a plurality of free surfaces, and can also include a reflecting layer in which a reflex material such as aluminum and the like is deposited and formed by a deposition method.

The semiconductor light source 122 can be mounted directly on the mounting base board 120 without a sub mount substrate 21 (FIG. 3). The mounting base board 120 can be composed of an insulating material such as a ceramic having a high thermal conductivity, etc. The mounting base board 120 can include a concave portion **120*a* facing a radiating base plate of the heat sink 110. The concave portion 120*a* can be formed in at least one of the mounting base board 120 and the radiating base plate of the heat sink 110. In this case, the thermal conductive viscous material can be disposed in a space between the concave portion 120***a* and the radiating base plate of the heat sink 110.

Therefore, even when the semiconductor light source 122 is surrounded with the projector lens 130 and the mounting base plate 120, heat developed from the semiconductor light source 122 can radiate to the heat sink 110 via the mounting base board 120 and the thermal conductive viscous material with confidence. In addition, because a thickness of the space between the concave portion 120*a* and the radiating base plate can also be thicker than the maximum particle size of the inclusion disposed in the thermal conductive viscous material, the semiconductor light source 122 can be located at a prescribed position with respect to the projector lens 130 and the radiating base plate of the heat sink 110 in an accurate fashion.

Thus, the vehicle headlight 101 can also be mass-produced so that a light distribution pattern thereof can conform to a light distribution standard for a headlight. In the second exemplary embodiment, because the above-described variations including holes that pass through the mounting base board 120, the proper application of the thermal conductive viscous material can be confirmed from the holes.

When the vehicle headlight 101 is used as a fog lamp, an amber LED can be used as the semiconductor light source 122. When white light is emitted from the vehicle headlight 101, the semiconductor light source 122 can include blue LED chips having a peak wavelength of 460 nanometers and a yellow phosphor, which can emit a yellow light by exciting it with blue light emitted from the blue LED chips. In this case, the semiconductor light source 122 can emit substantially white light by an additive color mixture of the excited yellow light emitted from the yellow phosphor and a part of the blue light emitted from the blue LED chips.

As the yellow phosphor, $Y_3Al_5O_{12}:Ce^{3+}$ (YAG), $(Sr, Ba)_2SiO_4:Eu^{2+}$, $Ca_x(Si, Al)_{12}$ $(O, N)_{16}:Eu^{2+}$ and the like can be used. In place of the yellow phosphor, a red phosphor wavelength-converting the blue light emitted from the blue LED chips into red-purple light and a green phosphor wavelength-converting the blue light into blue-green light can also be used. In this case, the semiconductor light source 122 can emit light having substantially white light by an additive color mixture of the red-purple light that is excited by the blue light, the blue-green light emitted from the green phosphor and a part of the blue light.

As the red phosphor, $CaAlSiN_3:Eu^{2+}$, $Ca_2Si_5N_8:Eu^{2+}$, $La_2O_2S:Eu^{3+}$, $KSiF_6:Mn^{4+}$, $KTiF_6:Mn^{4+}$ and the like can be used. $Y_3(Ga, Al)_5O_{12}:Ce^{3+}$, $Ca_3Sc_2Si_3O_{12}:Ce^{3+}$, $CaSc_2O_4:Eu^{2+}$, $(Ba, Sr)_2SiO_4:Eu^{2+}$, $Ba_3Si_6O_{12}N_2:Eu^{2+}$, $(Si, Al)_6$ $(O, N):Eu^{2+}$ and the like can be used as the green phosphor. An LED of InGaN series that emits near-ultraviolet light having a wavelength of approximately 380 nanometers, a laser diode that emits ultraviolet light and the like can also be used in place of the blue LED chips.

In this case, in order to emit the substantially white light, a wavelength converting material can include: a red phosphor wavelength-converting the ultraviolet light into red light; a green phosphor wavelength-converting the ultraviolet light into green light; and a blue phosphor wavelength-converting the ultraviolet light into blue light. $CaAlSiN_3:Eu^{2+}$, $Ca_2Si_5N_8:Eu^{2+}$, $La_2O_2S:Eu^{3+}$, $KSiF_6:Mn^{4+}$, $KTiF_6:Mn^{4+}$ and the like can be used as the red phosphor. $(Si, Al)_6(O, N):Eu^{2+}$, $BaMgAl_{10}O_{17}:Eu^{2+}Mn^{2+}$, $(Ba, Sr)_2SiO_4:Eu^{2+}$ and the like can be used as the green phosphor. $(Sr, Ca, Ba, Mg)_{10}(PO_4)_6Cl_2:Eu^{2+}$, $BaMgAl_{10}O_{17}:Eu^{2+}$, $LaAl(Si, Al)_6$ $(N, O)_{10}:Ce^{3+}$can be used as the blue phosphor. When yellow light is emitted by the ultraviolet light, the yellow light may also be emitted by the red phosphor and the green phosphor.

As described above, the disclosed subject matter can prevent a positional misalignment of the semiconductor light source with respect to the reflector in a reflector type headlight or a projector lens in the projector type headlight, which is caused by variability of the inclusion disposed in the thermal conductive viscous material. The disclosed subject matter can also transmit heat generated from the semiconductor light source to the heat sink with confidence via the thermal conductive material including inclusions having a high thermal conductivity. Thus, the disclosed subject matter can provide vehicle headlights including the radiation structure having a high radiation performance and positional accuracy for the semiconductor light source.

In addition, an applying state (proper application or distribution) of the thermal conductive viscous material can be confirmed from the holes, which pass from the mounting base board to the concave portion where the thermal conductive viscous material is disposed. Thus, the disclosed subject matter can significantly reduce the amount of defective products that may break down when being used for a long time under a severe environment caused by high temperatures.

Furthermore, the above-described embodiments are described as a radiating structure for vehicle headlights. However, the radiating structure can be used for various headlights including the semiconductor light source and the heat sink, and therefore can also be used for an auxiliary headlight such as a fog lamp, a spot light, a driving light, etc.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle headlight comprising:

a mounting base board having a top surface and a bottom surface that are opposite with respect to each other and are formed as substantially respective flat surfaces, the top surface of the mounting base board including a mounting region;

a semiconductor light source mounted on the mounting region of the mounting base board;

a heat sink including a radiating base plate having a top surface of a substantially flat surface, the radiating base plate having a top surface, the top surface of the radiating base plate being attached to the bottom surface of the mounting base board, wherein at least one of the bottom surface of the mounting base board and the top surface of the radiating base plate includes a concave portion, the concave portion being larger than the mounting region of the mounting base board, the concave portion including an opposing surface of the mounting region of the mounting base board, the opposing surface being located on the bottom surface of the mounting base board;

a reflector having an opening portion located adjacent the radiating base board of the heat sink so that light emitted from the semiconductor light source is emitted in a light-emitting direction of the vehicle headlight from the opening portion of the reflector;

at least one hole passing through the mounting base board and located toward the concave portion of the at least one of the bottom surface of the mounting base board and the top surface of the radiating base plate; and a thermal conductive viscous material including an inclusion having a maximum particle size, the thermal conductive viscous material disposed in the concave portion of the at least one of the bottom surface of the mounting base board and the top surface of the radiating base plate, wherein a depth of the concave portion is deeper than the maximum particle size of the inclusion of the thermal conductive viscous material wherein the thermal conductive viscous material is viewable from the at least one hole.

2. The vehicle headlight according to claim 1, wherein the reflector is configured with a plurality of free surfaces.

3. The vehicle headlight according to claim 1, further comprising:

a casing located adjacent the heat sink; and an outer lens located in front of the opening portion of the reflector so as to surround the vehicle headlight and the casing.

4. The vehicle headlight according to claim 1, wherein the concave portion of the at least one of the bottom surface of the mounting base board and the top surface of the radiating base plate is formed in a substantially rectangular shape and the at least one hole passing through the mounting base board includes holes formed at four corners adjacent the concave portion.

5. The vehicle headlight according to claim 1, wherein the at least one hole passing through the mounting base board includes a plurality of holes located in a symmetric fashion with respect to a center of the semiconductor light source.

6. The vehicle headlight according to claim 1, wherein the thermal conductive viscous material is a silicone grease.

7. The vehicle headlight according to claim 1, wherein the inclusion of the thermal conductive viscous material includes at least one of aluminum, alumina, copper oxide, zinc oxide and a ceramic.

8. The vehicle headlight according to claim 1, wherein the semiconductor light source includes at least one blue light-emitting chip and a wavelength converting material that is selected from the group consisting of a yellow phosphor, and two phosphors including a red phosphor layer and a green phosphor layer.

9. The vehicle headlight according to claim 2, wherein the semiconductor light source includes an ultraviolet light-emitting chip and a wavelength converting material including at least one of a red phosphor, a green phosphor and a blue phosphor.

10. A vehicle headlight comprising:

a mounting base board having a top surface and a bottom surface that are opposite with respect to each other and are formed in substantially respective flat surfaces, and the top surface including a mounting region;

a semiconductor light source mounted on the mounting region;

a heat sink including a radiating base plate having a top surface of a substantially flat surface, the radiating base plate having a top surface, the top surface of the radiating base plate being attached to the bottom surface of the mounting base board, wherein at least one of the bottom surface of the mounting base board and the top surface of the radiating base plate includes a concave portion, the concave portion being larger than the mounting region of the mounting base board, the concave portion including an opposing surface of the mounting region of the mounting base board, the opposing surface located on the bottom surface of the mounting base board;

a projector lens having a light outgoing surface and a rear surface located in front of the semiconductor light source so that light emitted from the semiconductor light source is emitted in a light-emitting direction of the vehicle headlight from the light outgoing surface of the projector lens;

at least one hole passing through the mounting base board and located toward the concave portion of the at least one of the bottom surface of the mounting base board and the top surface of the radiating base plate; and a thermal conductive viscous material including an inclusion having a maximum particle size, the thermal conductive viscous material disposed in the concave portion of the at least one of the bottom surface of the mounting base board and the top surface of the radiating base plate, wherein a depth of the concave portion is deeper than the maximum particle size of the inclusion of the thermal conductive viscous material wherein the thermal conductive viscous material is viewable from the at least one hole.

11. The vehicle headlight according to claim 10, wherein at least one of the light outgoing surface and the rear surface of the projector lens is configured with a plurality of free surfaces.

12. The vehicle headlight according to claim 10, further comprising:

a casing located adjacent the projector lens and the heat sink.

13. The vehicle headlight according to claim 10, wherein the concave portion of the at least one of the bottom surface of the mounting base board and the top surface of the radiating base plate is formed in a substantially rectangular shape and the at least one hole passing through the mounting base board includes holes located adjacent four corners of the concave portion.

14. The vehicle headlight according to claim 10, wherein the at least one hole passing through the mounting base board includes a plurality of holes located in a symmetric fashion with respect to a center of the semiconductor light source.

15. The vehicle headlight according to 11, wherein the thermal conductive viscous material is a silicone grease.

16. The vehicle headlight according to 10, wherein the inclusion of the thermal conductive viscous material includes at least one of aluminum, alumina, copper oxide, zinc oxide and a ceramic.

17. The vehicle headlight according to claim 10, wherein the semiconductor light source includes at least one blue light-emitting chip and a wavelength converting material that is selected from the group consisting of a yellow phosphor, and two phosphors including a red phosphor layer and a green phosphor layer.

18. The vehicle headlight according to claim 10, wherein the semiconductor light source includes an ultraviolet light-emitting chip and a wavelength converting material including at least one of a red phosphor, a green phosphor and a blue phosphor.

* * * * *